A. MORRIS.
MOWING MACHINE.
APPLICATION FILED NOV. 30, 1912.
1,111,081.
Patented Sept. 22, 1914.
2 SHEETS—SHEET 1.
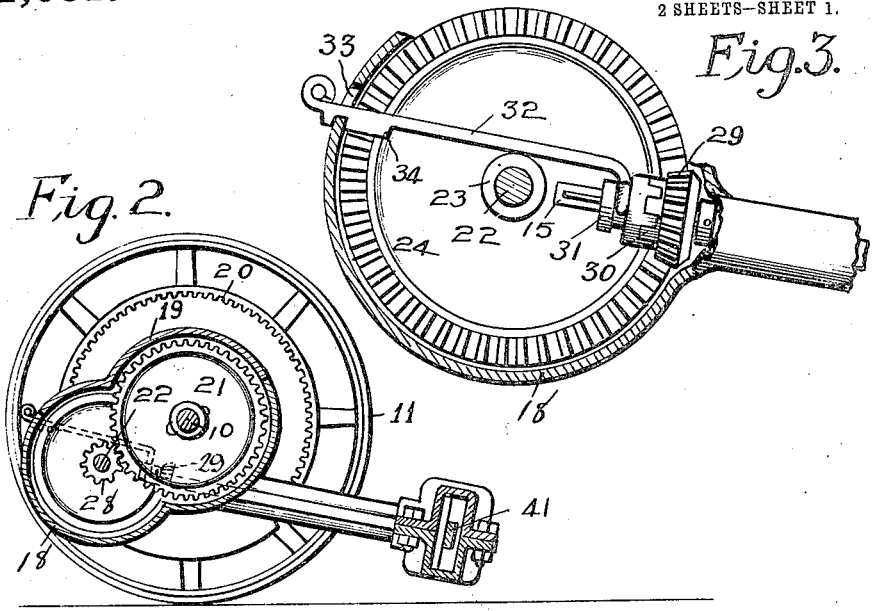
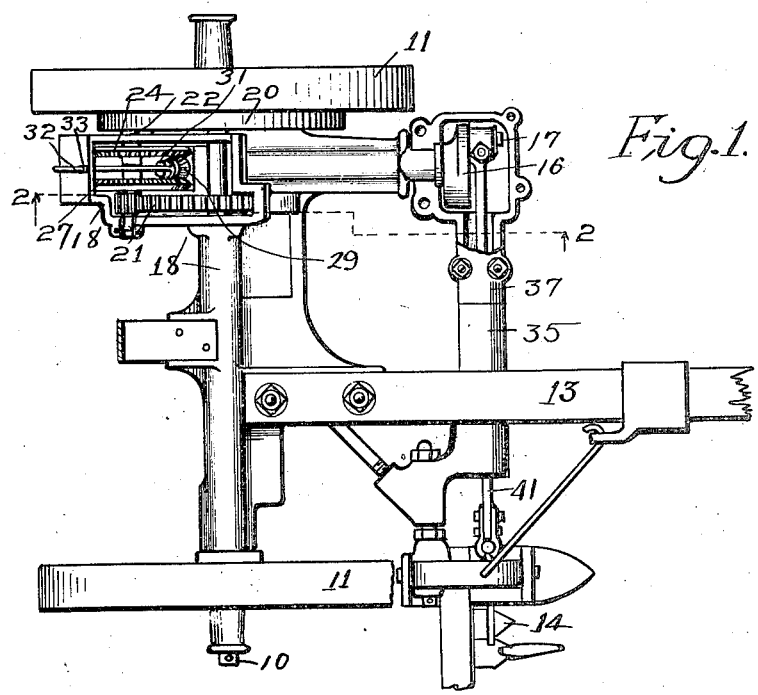
Witnesses
A. G. Hague
W. A. Loftus.
Inventor
Adis Morris
by Orwig & Bair Atty.

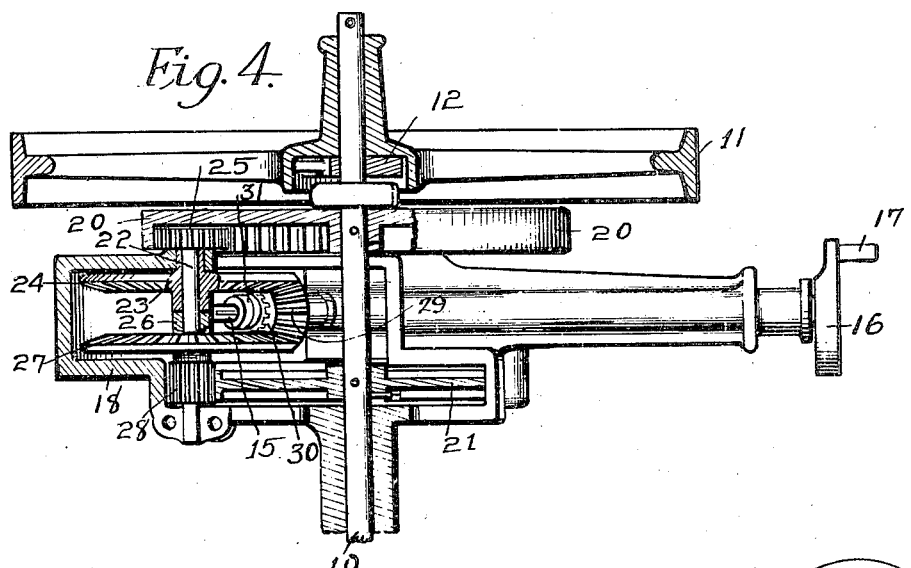

UNITED STATES PATENT OFFICE.

ADIS MORRIS, OF INDIANOLA, IOWA.

MOWING-MACHINE.

1,111,081.

Specification of Letters Patent. Patented Sept. 22, 1914.

Application filed November 30, 1912. Serial No. 735,002.

*To all whom it may concern:*

Be it known that I, ADIS MORRIS, a citizen of the United States, residing at Indianola, in the county of Warren and State of Iowa, have invented a certain new and useful Mowing-Machine, of which the following is a specification.

The object of my invention is to provide simple, durable and inexpensive means for transmitting power from the driving axle of a mower to the cutter bar.

More specifically it is my object to provide a double gear for the crank shaft so arranged that the beveled pinion on the crank shaft will be constantly in engagement with two beveled gears on opposite sides running in opposite directions to thereby prevent lateral strains upon the crank shaft and also to prevent lost motion between the intermeshing beveled pinion and gears.

A further object is to provide an improved construction for the pitman whereby the pitman may be thoroughly oiled and protected from dust and the difficulties incident to lost motion between the pitman and the crank wheel eliminated.

My invention consists in certain details, in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a part of a mowing machine embodying my invention. Fig. 2 shows a sectional view on the line 2—2 of Fig. 1. Fig. 3 shows an enlarged, detail, sectional view illustrating the means for operating the clutch on the crank shaft and connected parts. Fig. 4 shows a detail view of the gearing devices between the main axle and the crank shaft. In this view some of the parts are illustrated in cross section to show the structural details. Fig. 5 shows a front elevation of the means for transmitting power from the crank to the cutter bar. Fig. 6 shows a similar view in vertical section. Fig. 7 shows a sectional view on the line 7—7 of Fig. 6, and Fig. 8 shows a sectional view on the line 8—8 of Fig. 6.

Referring to the accompanying drawings, I have used the reference numeral 10 to indicate the main axle of a machine having thereon the supporting wheels 11 provided with the usual ratchet devices 12 between the wheels and the axle. The tongue of the mower is indicated by the numeral 13 and the reciprocating cutter bar by the numeral 14. The crank shaft which is of the ordinary construction is indicated by the numeral 15 and is provided on its forward end with a crank wheel 16 having a wrist pin 17.

All of the parts before described are of the ordinary construction and perform the usual function.

I preferably provide a cast metal casing indicated generally by the numeral 18 for inclosing the main axle, the crank shaft and the gearing devices between them. This casing is also preferably provided with a detachable portion 19 by which access my be had to the gearing devices hereinafter described.

For the purpose of transmitting power to the crank shaft from the axle, I have fixed to the axle an internal gear wheel 20 and also a gear wheel 21 having teeth on its periphery and being spaced apart from the internal gear 20. Mounted in the casing 18 is a stationary shaft 22 on which is supported a hub 23. This hub is provided with a beveled gear 24 and a small gear 25, the latter being in mesh with the internal gear wheel 20. On the same shaft 22 is another hub 26 having fixed thereto a beveled gear 27 and a small gear 28. The gear 25 is of such size with relation to the internal gear 20 as to rotate the beveled gear 24 at the same speed as the beveled gear 27 is rotated by the gear 21 and the gear 28. However, it is obvious that the beveled gears 24 and 27 will rotate in opposite directions.

Rotatably mounted on the crank shaft is a beveled pinion 29 provided with a clutch member 30 and slidingly mounted on the crank shaft is a coacting clutch member 31. An arm 32 is connected to the clutch member 31 and is projected through an opening 33 in the casing so that an operator may engage said arm to manipulate the clutch. The arm 32 is preferably provided with a notch clearly shown in Fig. 3 whereby it may be supported in position with the two clutch members in engagement, and it is also provided with a shoulder 34 by which the movable clutch member may be supported in position out of engagement with the other clutch member.

There are a number of advantages attained by the use of my improved gearing devices between the axle and the crank shaft. By having the two beveled gear wheels 24 and 27 in engagement with opposite sides of the beveled pinion 29, all tendency for lateral movement of the beveled pinion 29 is avoided as the two gear wheels 24 and 27 firmly hold the pinion 29 and the end of the shaft to which it is attached against such lateral movement. Furthermore by an arrangement of this kind the gear wheels may be made in the ordinary manner and there will be a minimum of lost motion of power as applied from the axle 10 to the crank shaft 15.

Arranged between the crank wheel 16 and the cutter or sickle bar is a casing for the pitman and crank wheel. This casing comprises a cylindrical body portion 35 open at the end toward the sickle bar and having an enlarged portion 36 at its other end which inclosed the crank wheel. A detachable member is provided for the top portion of the casing which is indicated by the numeral 37, the end of the casing that surrounds the crank wheel being connected with the part of the frame 18 adjacent thereto, as shown in Fig. 1. The said cylindrical casing member 35 is inclined slightly toward the sickle bar, as clearly shown in Fig. 6. Fixed in position at about the central portion of the casing member 35 is a partition 38 having a stuffing box 39 at its central portion. Slidingly mounted between the partition 38 and the lower end of the casing 35 is a disk 40 to which a pitman member 41 is pivoted, the other end of said pitman member being connected to the sickle bar in the ordinary way. Mounted within the upper portion of the casing member 35 is a perforated disk 42 slidingly mounted and having a pitman member 43 fixed to it. This pitman 43 is extended through the stuffing box 39 and is attached to the disk 40. A third pitman member 44 is pivoted to the disk 42 and is also connected to the wrist pin 17. I preferably provide in the casing member 37 a screw plug 45 which may be removed to insert oil and also a screw plug 46 in the casing 35 adjacent to the partition 38 which may be removed to clean out the casing. Some of the advantages of this part of my improvement are that during the very rapid reciprocation of the disk 42 the oil contained within the casing is distributed throughout the interior of the casing and tends to minimize friction and to keep all of the parts cool. For the reason just given the connection between the pitman member 44 and the wrist pin 17 may be made comparatively tight and free from lost motion so that during the operation of the sickle bar there is practically no pounding between the pitman member 44 and the wrist pin when at the ends of the pitman member's stroke. Furthermore, the entrance of dust is prevented which also tends to minimize wear between the working parts.

On account of the fact that the upper end of the pitman 41 is slidably mounted there is not the tendency to jerk the cutter bar up and down that exists where the cutter bar pitman is connected directly with the crank wheel.

By means of my improvement power is transmitted to the main axle of the reciprocating cutter bar with a minimum of friction and almost noiselessly. Hence the life or durability of the device is greatly increased and all pounding at the ends of the pitman stroke is prevented. Furthermore the operator need not stop frequently for the purpose of lubricating the connection between the pitman and the crank wheel as a comparatively large quantity of lubricating oil may be contained within the crank case.

I claim as my invention:

1. In a mowing machine, the combination of an axle, a crank shaft, a pinion on the crank shaft, two gear wheels in mesh with the pinion on the crank shaft and on opposite sides thereof, and means for operatively connecting both of the gear wheels with the main axle to run in opposite directions and at the same speed.

2. In a mowing machine, the combination of a main axle, a crank shaft, a beveled pinion on the crank shaft, two beveled pinions in mesh with the beveled pinion on the crank shaft and on opposite sides thereof, an internal gear wheel fixed to the axle, a pinion in mesh with the internal gear and operatively connected with one of the beveled gear wheels, a gear wheel fixed to the axle, a pinion in mesh therewith and operatively connected with the other of said beveled gear wheels, the proportions of said gearing devices being such as to operate both the beveled gear wheels at the same speed.

3. In a mowing machine, the combination of a main axle, a crank shaft, a beveled pinion on the crank shaft, two beveled pinions in mesh with the beveled pinion on the crank shaft and on opposite sides thereof, an internal gear wheel fixed to the axle, a pinion in mesh with the internal gear and operatively connected with one of the beveled gear wheels, a gear wheel fixed to the axle, a pinion in mesh therewith and operatively connected with the other of said beveled gear wheels, the proportions of said gearing devices being such as to operate both the beveled gear wheels at the same speed, and a clutch device for the beveled pinion on the crank shaft.

4. In a mowing machine, the combination of a crank shaft, means for rotating it, a crank wheel thereon, a pitman member connected to the crank wheel, a sliding support pivotally connected to the other end of said pitman member, a casing in which the sliding support is mounted, said casing being provided with an extension for inclosing the crank wheel and the said pitman member, a partition in said casing, a second pitman member pivotally connected with the sliding member and extended through said partition, and a third pitman member pivotally connected with the second pitman member and designed to be connected to a sickle bar, said sliding member being provided with openings through which oil may freely pass.

5. In a mowing machine, the combination of a main frame, a crank shaft rotatably mounted in the main frame, a crank wheel thereon, a crank case connected with the main frame and having a part to surround the crank wheel and also having a cylindrical extension having one end communicating with the crank case and the other end being open toward the sickle bar of the mowing machine, a partition fixed within the cylindrical portion and provided with a stuffing box, a sliding perforated disk within the cylindrical casing, a pitman member pivotally connected to the sliding disk and also connected to the crank wheel, a pitman member fixed to the sliding disk and extended through the stuffing box in the partition, a second sliding member between the partition and the end of the casing toward the sickle bar, and a third pitman member pivoted to said sliding member and designed to be pivotally connected to a sickle bar, said crank case and the cylindrical casing being designed to hold a quantity of oil and said perforated sliding support being designed to permit the oil to flow freely through it, for the purposes stated.

6. In a mowing machine, the combination of a crank shaft, a crank wheel thereon, a reciprocating cutter or sickle bar, a pitman operatively connected at one end with the sickle bar, means for slidably supporting the other end of said pitman, and a second pitman operatively connected with the crank wheel and the first pitman.

Des Moines, Iowa, December 6, 1911.

ADIS MORRIS.

Witnesses:
M. WALLACE,
BESSIE E. DEAL.